United States Patent [19]

Smith, Jr.

[11] Patent Number: 4,732,944

[45] Date of Patent: Mar. 22, 1988

[54] IONOMER RESIN FILMS

[75] Inventor: W. Novis Smith, Jr., Philadelphia, Pa.

[73] Assignee: Advanced Glass Systems, Inc., Trumbauersville, Pa.

[21] Appl. No.: 866,913

[22] Filed: May 27, 1986

Related U.S. Application Data

[62] Division of Ser. No. 642,042, Aug. 17, 1984, Pat. No. 4,619,973.

[51] Int. Cl.$^4$ ................................................ C08F 8/32
[52] U.S. Cl. ........................ 525/329.9; 260/DIG. 31; 525/382
[58] Field of Search .......................... 525/329.7, 329.9; 260/DIG. 31

[56] References Cited

U.S. PATENT DOCUMENTS

| | | | |
|---|---|---|---|
| 3,328,367 | 6/1967 | Rees | 260/DIG. 31 |
| 3,344,014 | 9/1967 | Rees | 260/DIG. 31 |
| 3,404,134 | 10/1968 | Rees | 260/DIG. 31 |
| 3,471,460 | 10/1969 | Rees | 260/DIG. 31 |

Primary Examiner—Christopher Henderson
Attorney, Agent, or Firm—Steele, Gould & Fried

[57] ABSTRACT

An ionomer resin, a film or sheet of the ionomer resin and laminated articles having a lamina of the ionomer resin film are provided. The ionomer resin consists of ionically crosslinked ethylene-methacrylic acid copolymer or ethylene-acrylic acid copolymer which is neutralized with a polyamine, preferably a diamine, that contains at least one R—CH$_2$—NH$_2$ group and the R may contain: (—CH$_2$NH$_2$)$_x$; (—NH$_2$)$_x$; or (R'R"NH)$_y$ where x=1 or more, y=0 or more. The polyamine neutralized ionomer resin may be formed into a film or sheet which may be self-supporting or may be laminated to glass to form a safety glass.

12 Claims, 13 Drawing Figures

IONOMER RESIN FILMS

This application is a divisional of application Ser. No. 642,042 filed Aug. 17, 1984, now U.S. Pat. No. 4,619,973.

BACKGROUND OF THE INVENTION

1. Field of the Invention

This invention relates ionomer resins, to transparent ionomer resin films, and in particular relates to individual sheets of ionomer resin films and ionomer resin films for use in laminates, including laminated glass, and further relates to ionomer resins which are neutralized with polyamines to produce thicker, stronger transparent films.

2. Description of Prior Art

Safety glass can be reinforced by lamination with an inner layer of polycarbonate. The resulting lamination, however, is impractical for two principal reasons. One reason is insufficient bond strength when the polycarbonate is bonded directly to the glass. A second, and even more important reason stems from polycarbonate and glass having different co-efficients of thermal expansion. In safety glass laminates wherein polycarbonate is bonded directly to glass, the polycarbonate can crack and craze on cooling from the temperature necessary to bond the two together, because of the different thermal expansion co-efficients of the components.

Initial attempts to solve these problems involved interposing additional interlayers of polyvinyl butyral between the polycarbonate and the glass. Adhesion between the polycarbonate and the glass proved insufficient unless a plasticizer was also used. However, when a plasticizer was used, the plasticizer often caused the polycarbonate to develop stress cracks, and accordingly, to have low light transmission properties.

The initial problems appear to have been solved by using the laminated safety glass described in U.S. Pat. No. 3,888,032, which has achieved wide commercial success. The laminate comprises polycarbonate reinforced glass wherein the polycarbonate and glass are bonded to one another by an interlayer of polyurethane. Polyurethane provides sufficient adhesion to glass and to the polycarbonate, and no stress cracking or cloudiness develops in the product.

Despite the commercial success of polyurethane laminated product, there has been a continuing effort to develop less expensive products, particularly as polyurethane is an expensive component. This invention provides new glass laminates, with and without layers of polycarbonates, and other reinforcing transparent plastics, which are considerably less expensive than the polyurethane laminates, yet which at the same time are every bit as satisfactory, if not more so, with regard to adhesion, strength and clarity. Laminates according to this invention comprise at least one layer of glass laminated with an ionomer resin film.

In the specification and claims the term "ionomer" or "ionomer resin" mean an extrudable resin comprising ionically crosslinked ethylene-methacrylic acid and ethylene-acrylic acid copolymers. Properties which distinguish these ionomer resins from other polyolefin heat-seal polymers are high clarity, tear resistance, abrasion resistance, solid-state toughness and resistance to oil-fat permeation. The starting ionomer resins are generally available as either a partially neutralized sodium or a zinc ionomer, and are available in a wide variety of grades. However, as will be discussed hereafter, the esters or the non-neutralized form of the resin are also adaptable to the present invention. Amine ionomers have also been produced.

Various grades of ionomer resins are available for extrusion coating and film extrusion. It is also known that ionomer resins can be co-extruded with other plastic resins and exhibit adhesion to other polyolefins, nylon resins and coextrudable adhesive resins often used as bonding layers in multi-ply coextruded structures. A very wide variety of partially neutralized ionomer resins are manufactured by E. I. DuPont de Nemours and Company under the registered trademark "SURLYN".

Ionomer resins have been suggested for use primarily in the area of packaging, for foods, liquids and pharmaceuticals, as well as certain industrial applications including lightweight sails, bonded cable sheath, roof underlayments and flame retardant products. In most applications, ionomer resins are offered as a superior substitute for polyethylene. In none of the literature or prior art other than the applicants' co-pending application Ser. No. 490,997, filed May 3, 1983, is there any suggestion that ionomer resins should or could be used for reinforcing glass layers, in order to form a laminated safety glass. There is no suggestion in the literature or prior art other than previously noted indicating that ionomer resins could or should be substituted generally for polyurethanes. Moreover, it has been generally assumed that ionomer resin films thicker than 10 mil cannot be obtained while still maintaining optical clarity of at least 60% light transmission.

Layers of ionomer resins can be formed by casting, forming blown film or extrusion, the latter being preferred. Once formed, there are no significant differences between cast, blown and extruded layers. When the ionomer resin layer is sufficiently thick, polycarbonate layers can be eliminated altogether in forming layered materials, and if the ionomer layer can be made sufficiently thick without interfering with optical clarity, an unsupported film can be provided.

Ionomer resins have several advantages over polyurethane. Polyurethane is difficult to manufacture, is expensive and is hard to fabricate. Also, polyurethane is frequently not clear enough for use in windshields and the like. By contrast, ionomer resin films can be easily extruded to desired thicknesses, and at about one-half the material cost of polyurethane. Ionomer resins have demonstrated better adhesion characteristics to glass and polycarbonates, as well as better resistance to lower temperatures. In preferred embodiments, the surface to which the ionomer resin is bonded may be primed to get good adhesion, as is the case with polyurethane. Silane coupling agents are suitable primers. With regard to optical properties, ionomer resins demonstrate better clarity than polyurethanes when prepared according to the invention.

When films of the ionomers of copolymers of ethylene-methacrylic acid or ethylene-acrylic acid have previously been formed, they usually only retain their clarity when formed in very thin films. The clarity of the films is insured because the ionomers can be cooled quickly after being melted. Rapid cooling prevents finely dispersed crystalites from being formed and, thereby, creating a hazy film. These crystalites lower the light transmission of the film and give lower clarity to the film. In thicker films and sheets of the ionomer, the degree of clarity becomes an important problem since a larger mass of the film cools much more slowly and allows the crystalites a greater opportunity to form and grow. In fact, clear sheets of 20 mils or thicker are not obtained with clarity under normal cooling conditions. Rapid quenching of the thick layers can help, but rapid quenching becomes impossible or at least very difficult if the ionomer sheet is laminated or is a part of a larger object. When transparent windshields are to be made from ionomer films, some means is required in order to prevent the crystalites from forming and creating the resulting haze in the film during processing and cooling.

The present invention primarily concerns development of diamine neutralized carboxylic acid-containing hydrocarbon polymers which can be formed into transparent sheets or films which are substantially thicker than previously thought obtainable.

U.S. Pat. No. 3,471,460 to Rees also teaches diamine-modified acrylic or metacrylic acid hydrocarbon copolymers, and in the discussion thereof indicates that diamines may also be used as modifying or neutralizing materials. The present invention, however, provides a group of diamines which are an improvement over that patent in that only primary diamines and polyamines are preferred. The Rees patent includes many diamines, but does not include:

Bis[1,3-aminomethyl]cyclohexane (BAC; which is the preferred diamine):

or 1,3-diaminomethyl xylene (1,3 xylylenediamine):

or isophorone diamine:

The present invention preferably excludes all diamines or polyamines that are not primary and that do not have at least two groups; where $R^1$, $R^2$, $R^3$, $R^4$, are H, alkyl, cycloalkyl or aryl groups.

The present invention also excludes aromatic primary amines, i.e.

and focuses on diamines and polyamines that have one or more ($H_2N-CH_2-$) groups per molecule.

The amine groups in $-CH_2NH_2$ structure should form the strongest interaction with free carboxyl groups in the ethylene methacrylic acid or ethylene-acrylic acid copolymers or in the acrylic acid homopolymers. Therefore, the selected group of diamines which includes BAC, 1,6 hexane diamine and 1,12 dodecanediamine, form the strongest amine salt or ionomer bonds. These diamines form stable ionic bonds at the highest temperatures of all the amines, at which point these polymers will be in their most disordered and non-crystalline state. By forming strong amine salt bonds these diamines cross-link these polymers and fix them in their least crystalline form. Upon cooling these polymers become "frozen" in their non-crystalline form and remain optically clear. The broader general groups of amines that Rees described include mostly amines that will not produce significant optical clarity in the resulting neutralized polymer. The selected groups of diamines of the present invention form strong diamine ionomer bonds and the resulting polymers are tougher, stronger, and have greater optical clarity on the average than the groups of diamines which Rees teaches.

SUMMARY OF THE INVENTION

It is an object of the invention to provide an ionomer resin which is a diamine neutralized carboxylic acid-containing hydrocarbon polymer.

It is an object of this invention to provide a laminated article of glass and ionomer resins, and depending upon application, laminates of glass, ionomer resin and polycarbonate or other high impact transparent plastics as well. The laminated articles have all of the advantages and positive features of laminates of glass and polyurethane, but are significantly less expensive to produce and have other enhanced features such as increased clarity and more stable to delamination.

It is another object of this invention to provide a laminated article of glass, ionomer resin and high impact plastic which has good adhesion and which is transparent and resistant to breakage.

It is still another object of this invention to provide a laminated article of glass, ionomer resin and high impact plastic which has good strength properties over a wide temperature range.

And still further, it is an object of this invention to provide an ionomer film of thicker dimensions than previously possible without hazing or disruption of the clarity of light transmission through the film.

These and other objects of this invention are accomplished by providing an ionomer resin film which can be laminated to a sheet of glass, high plastic such as acrylic, or which can be used alone in thicknesses greater than 50 mils. The preferable ionomer resin film is an ionically crosslinked ethylene-methacrylic acid copolymer further crosslinked with a polyamine. The laminated articles may also comprise a sheet of plastic laminated to the ionomer resin film opposite the glass or plastic ionomer laminates themselves. The laminated articles may further comprise the ionomer resin film sandwiched between two sheets of glass. The laminated articles may still further comprise a sheet of ionomer-resin film sandwiched between sheets of the plastics. The laminated articles may still further comprise the ionomer resin film sandwiched between a sheet of glass and a sheet of plastic, and the ionomer resin film sandwiched between a sheet of glass and a sheet of metal. The laminated articles may also comprise any number of lamina of glass sandwiched with a lamina of ionomer resin, the resultant laminate having glass as the outer lamina. Further, the multi-layer laminate of glass and ionomer resin may have a glass/ionomer configuration, with glass as the outer layer and ionomer resin as the interior layer, the interior ionomer resin layer having further a polyester film layer laminated thereto on the side opposite the glass layer.

In fulfillment of further objects of this invention, the ionomer resin composition used in the laminate, or by itself, may be prepared by combining a copolymer of ethylene-methacrylic acid or ethylene-acrylic acid and a diamine or polyamine which contains at least one $R$—$CH_2$—$NH_2$ group, where $R$ may contain: $(—CH_2NH_2)_x$; $(—NH_2)_x$; and $(R'R''NH)_y$ and where $x=1$ or more, and $y=0$ or more, $R'$ and $R''$ may be any organic groups. The preferable structure of the diamine is $CH_2NH_2$—$R$—$CH_2NH_2$ and R will contain from one to twenty-five carbon atoms, and can contain aromatic rings, nitrogen, sulfur, oxygen or halogen atoms in the R group.

Still further, the ionomer resin may also be prepared by combining a partially neutralized copolymer of ethylene-methacrylic acid or ethylene-acrylic acid and diamine or polyamine as described above.

BRIEF DESCRIPTION OF THE DRAWING

The Figures illustrate cross-section views through portions of laminated articles made in accordance with this invention, wherein.

DETAILED DESCRIPTION OF THE PREFERRED EMBODIMENTS

Figure 1:
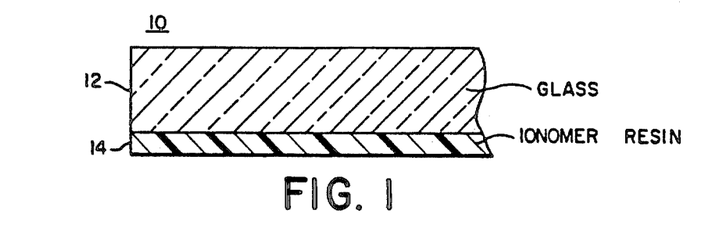
FIG. 1 is a glass/ionomer resin laminate.

The basic laminated article according to this invention is shown in FIG. 1. The laminated article 10 comprises a sheet of glass 12 laminated to an ionomer resin layer 14. The ionomer resin layer 14 is thicker in the basic laminated article than in articles including a layer of high impact plastic or a second layer of glass.

Figure 2:
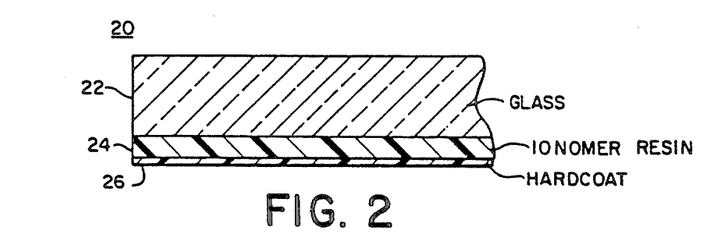
FIG. 2 is a glass/ionomer resin laminate having a hard coat on the otherwise exposed surface of the ionomer resin layer.

A second embodiment of a laminated article according to this invention is shown in FIG. 2. The laminate 20 comprises a sheet of glass 22 and an ionomer resin layer 24, similar to the laminate 10 of FIG. 1. However, the embodiment of FIG. 2 is further provided with a hard coat 26 on the otherwise exposed surface of the ionomer resin film, in order to enhance the ionomer resin film from scratching, abrasion and other similar damage. A "hard coat" provides abrasion resistant, optically transparent coatings which serve to protect the surface and render the laminate more resistant to scratching and the like. Useful "hard coat" compositions are described in U.S. Pat. No. 4,027,073, and U.S. patent application Ser. No. 473,790, filed Mar. 10, 1983 now abandoned, and assigned to the owner of this application.

Figure 3:
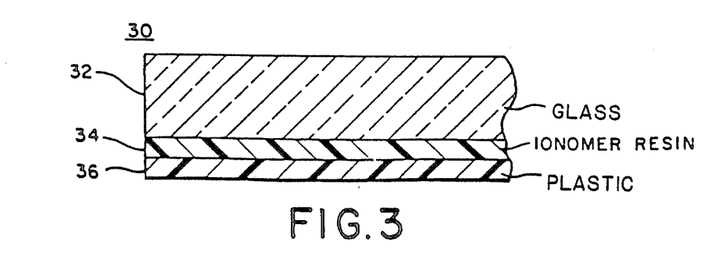
FIG. 3 is a glass/ionomer resin/plastic laminate.

A third embodiment of a laminated article according to this invention is shown in FIG. 3. The laminate 30 comprises a sheet of glass 32 laminated to an ionomer resin film 34, which is in turn laminated to a high impact transparent plastic layer 36. As additional strength is provided by the plastic layer 36, the ionomer resin layer 34 may be thinner than the ionomer resin layer 14 in the embodiment shown in FIG. 1. Examples of high impact, transparent plastic useful in this invention include polycarbonate and acrylic plastic, i.e. polymethylmethacrylate (PMMA), and such commercial plastics as the registered trademark materials LUCITE and PLEXIGLASS.

Figure 4:
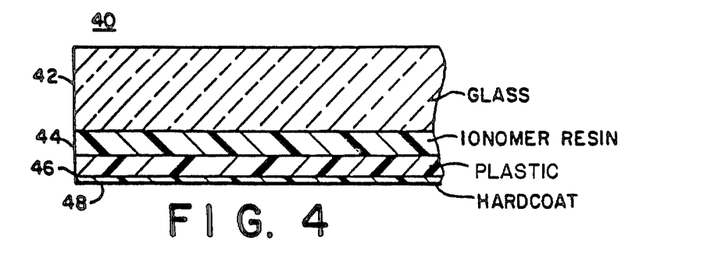
FIG. 4 is a glass/ionomer resin/plastic laminate having a hard coat on the otherwise exposed surface of the plastic layer.

A fourth embodiment of a laminated article according to this invention is shown in FIG. 4. The laminate 40 is similar to that of FIG. 3, in comprising a glass sheet 42, an ionomer resin layer 44 and a high impact plastic layer 46. Although the plastic is used to provide additional strength to the laminate, some plastics, like polycarbonate, are usually too soft and susceptible to solvents, and therefore subject to scratches and abrasion. Accordingly, the laminate 40 is provided with a hard coat layer 48 for protecting the otherwise exposed surface of the plastic layer 46.

Figure 5:
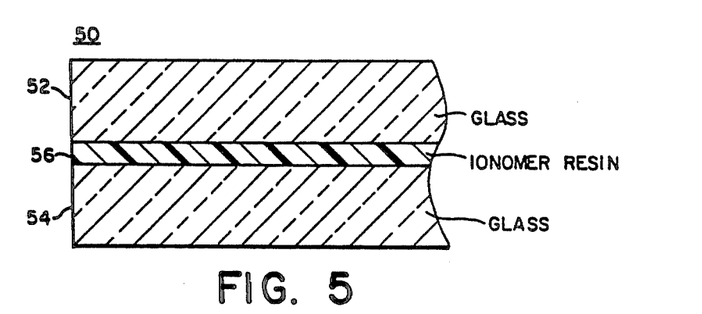
FIG. 5 is a glass/ionomer resin/glass laminate.

A fifth embodiment of a laminated article according to this invention is shown in FIG. 5. The laminate 50 comprises two sheets of glass 52, 54 joined by an ionomer resin layer 56. As no soft surfaces are exposed, no hard coat layer is necessary.

Figure 6:
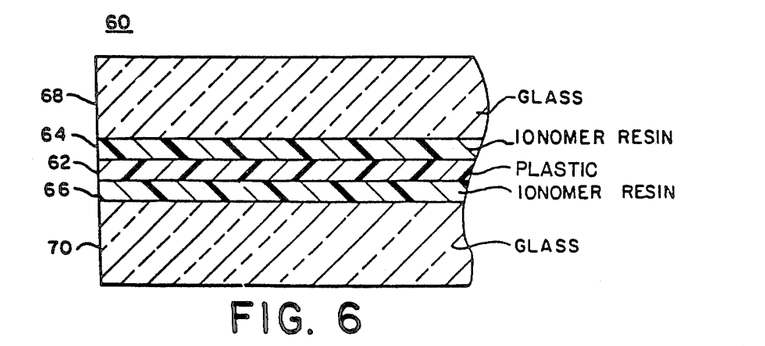
FIG. 6 is a glass/ionomer resin/plastic/ionomer resin/glass laminate.

A sixth embodiment of a laminated article according to this invention is shown in FIG. 6. The laminate 60 comprises first a plastic layer 62 sandwiched between two ionomer resin layers 64, 66. The ionomer resin/plastic/ionomer resin laminate is itself sandwiched between two glass sheets 68 and 70. As might be expected, the thicker and more complex laminate 60 shown in FIG. 6 is more expensive to produce than the laminates shown in FIGS. 1–5, but it exhibits greater strength and resistance to shattering and spalling.

Figure 7:
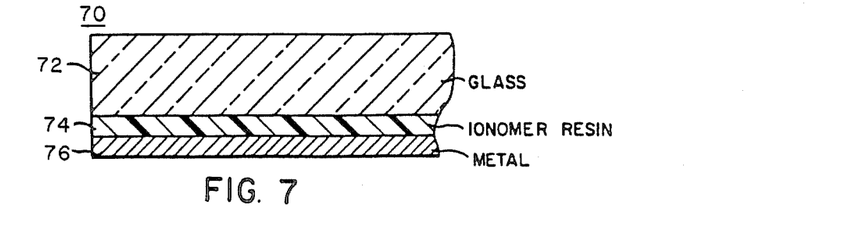
FIG. 7 is a glass/ionomer resin/metal laminate.

A seventh embodiment of a laminated article according to this invention is shown in FIG. 7. The laminated article 70 comprises a sheet of glass 72 and a sheet of metal 76 joined by an ionomer resin film layer 74. The metal layer 76 may be any metal such as aluminum, silver, iron and copper.

Figure 8:
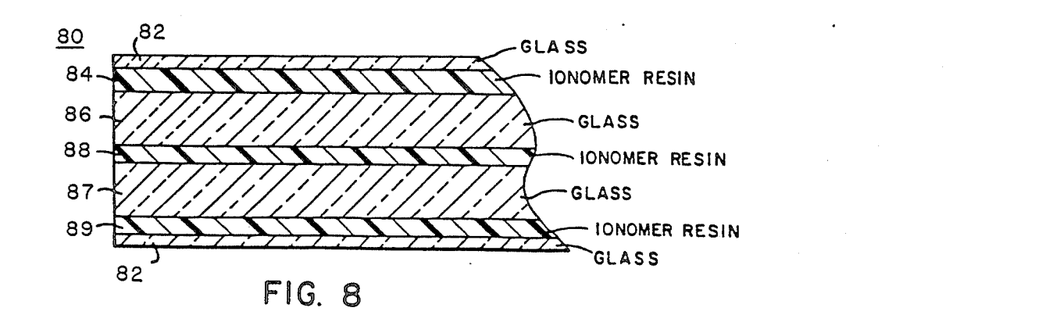
FIG. 8 is a glass/ionomer resin/glass/ionomer resin/glass/ionomer resin/glass laminate.

An eighth embodiment of a laminated article according to this invention is shown in FIG. 8. The laminated article 80 comprises sheets of glass 82, 86, 87 and 82 sandwiching ionomer resin film layers 84, 88 and 89.

Figure 9:
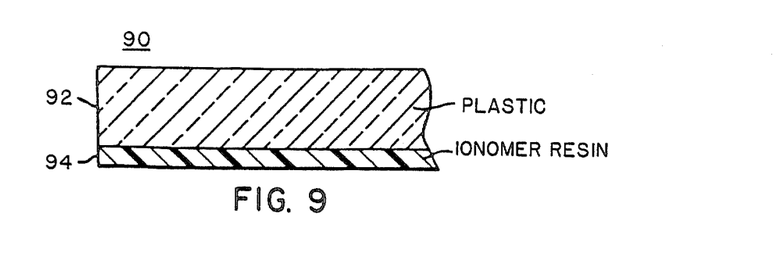
FIG. 9 is an ionomer resin/plastic laminate.

A ninth embodiment of the laminated article according to this invention is shown in FIG. 9. The laminated article 90 comprises a high impact transparent plastic layer 92 laminated to the ionomer resin layer 94. The ionomer resin layer 94 is thinner than the plastic layer 92.

Figure 10:
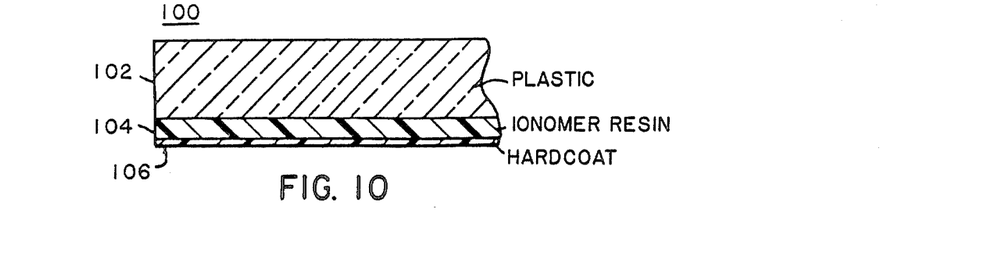
FIG. 10 is a plastic/ionomer resin/hardcoat laminate.

A tenth embodiment of the laminated article according to this invention is shown in FIG. 10. The laminated article 100 comprises an ionomer resin film 104 laminated to a plastic layer 102. The article is further provided with a hardcoat 106 on the otherwise exposed surface of the resin layer 104 in order to protect the resin layer from scratching, abrasion and other similar damage. In addition a protective hardcoat layer can also be provided on the otherwise exposed surface of the plastic layer 102 (not shown). As previously stated with respect to the second embodiment, useful "hardcoat" compositions are described in U.S. Pat. No. 4,027,073 and U.S. patent application Ser. No. 473,790, filed Mar. 10, 1983 now abandoned, and assigned to the owner of this application.

Figure 11:
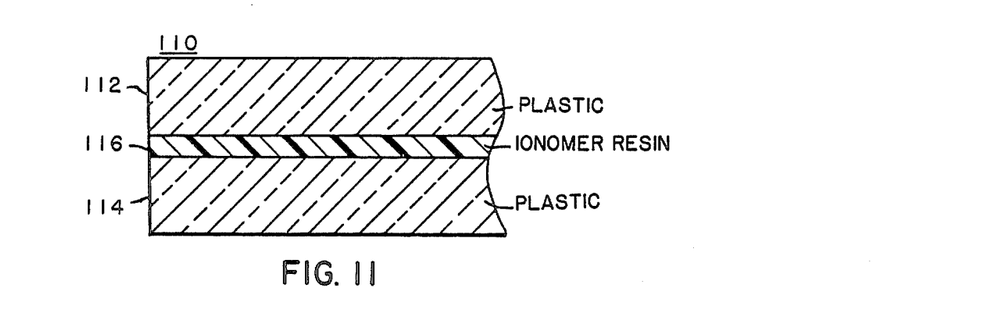
FIG. 11 is an plastic/ionomer resin/plastic laminate.

An eleventh embodiment of the laminated article according to this invention is shown in FIG. 11. The laminate 110 comprises an ionomer resin film 116 between two plastic layers 112, 114. Hardcoat layers on the plastic layers may also be provided (not shown).

Figure 12:
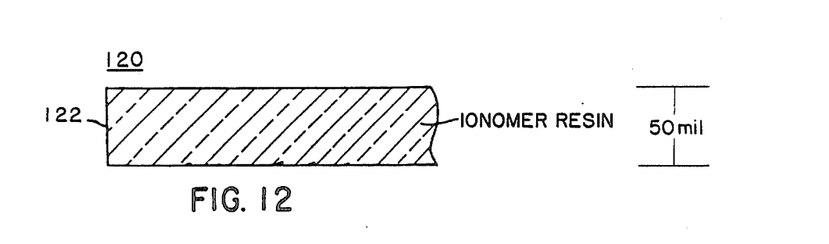
FIG. 12 is an individual ionomer resin layer having a thickness greater than 50 mils; and, FIG. 13 is a glass/ionomer resin/glass/ionomer resin/polyester film laminate.

A twelfth embodiment of the article according to the present invention is shown in FIG. 12. Therein, a single ionomer resin film layer 122 has a thickness greater than fifty mils.

Figure 13:
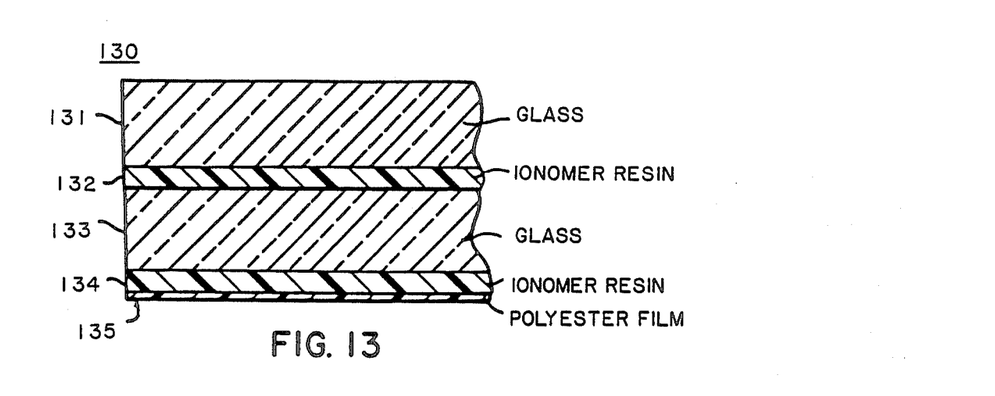

Finally a thirteenth embodiment of a laminated article according to the present invention is shown in FIG. 13. Therein, a laminate 130 comprises an outer glass layer 131; an ionomer resin layer 132 sandwiched the outer glass layer 131 and an inner glass layer 133; a second ionomer resin layer 133 laminated to the second glass layer 132; and a polyester film 135 laminated to the second ionomer resin layer 133. This embodiment is particularly useful for windshield laminates where the interior polyester film helps to provide an anti-lacerative surface which will help to prevent injury in the event of high impact contact. The preferred polyester film is MYLAR with a thickness of 0.005 inches.

The ionomer or ionomer resin of the invention is obtained by combining a copolymer of ethylene-methacrylic acid or ethylene-acrylic acid and a polyamine which contains at least one R—CH$_2$—NH$_2$ group, and the R may contain: (—CH$_2$NH$_2$)$_x$; (—NH$_2$)$_x$; or, (R'R"NH)$_y$, where x=1 or more, and y=0 or more. R' and R" may be any organic groups. The preferable structure of the diamine is:

NH$_2$CH$_2$—(R)—CH$_2$NH$_2$ where R contains from one to twenty five carbon atoms; R may be aliphatic, alicyclic or aromatic; and R may also contain:

—CH$_2$OCH$_2$—;

—CH$_2$—N—CH$_2$—;
　　　　|
　　　　H

—CH$_2$—N—CH$_2$—;
　　　　|
　　　　CH$_3$

-continued

CH$_3$
　　　　|
—O—Si—O;
　　　　|
　　　　CH$_3$

—CH$_2$—S—CH$_2$—;

O
　　　　　‖
—CH$_2$—S—CH$_2$—;

—S—;

O
　　‖
—S—;  and
　　‖
　　O

O
　　‖
—S—.

Examples of the diamines which can be used are
1, 12-diaminododecane;
1, 6-diaminohexane;
Bis [1, 3-aminomethyl] cyclohexane (BAC); and
1, 3-diaminomethylxylene.

Adding from 0.3% to 10% by weight one of the diamines or polyamines of this group or a mixture thereof to the copolymers neutralizes the free acidic carboxyl groups:

forming an amine salt:

In addition, the copolymer may already be partially neutralized with up to 90% of a metal cation such as sodium or other alkali metal, ammonium salt, zinc or even an aluminum salt. A particular example of such a copolymer is "SURLYN" 1601, manufactured by the Polymer Products Department of the DuPont Company. A data information sheet on SURLYN 1601 ionomer resin is available under No. E-29173(7/81). The information in this technical release, including the rheology curves, is incorporated herein by reference. SURLYN type 1707 is also a preferred sodium ionomer resin for use in this invention as a starting material for mixing with the polyamine.

When the ethylene-methacrylic acid or ethylene-acrylic acid copolymer is heated above the melting point (usually over 200° F. and preferably to 280° F.) the polymeric chains lose most of their crystallinity and the chains, particularly the polyethylene segments, become intertwined. When this randomization and intertwining occur in the presence of a diamine, the amine groups interact with the free carboxylic acid groups and form an amine salt locking the disorder which occurs at the high temperature into the polymer.

At the higher temperatures, this reaction is reversible and even reversible in the presence of the diamine; the polymer chains become less crystalline and random and become interwound upon being heated above the melting point. As the copolymer begins to cool, the diamine or polyamine reacts and forms amine salts with the free carboxyl groups. The more basic the amine and the less strictly hindered the amine groups, i.e., —CH$_2$—NH$_2$ groups, the stronger the bonds which are formed with the carboxyl, and the higher the temperature at which a non-reversible diamine or polyamine salt forms. In the case of the described diamine, the diamine salt can form non-reversibly at a temperature above the temperature whereat significant segments of the polyethylene chain or other segments of the polymeric chain can re-align and start forming larger crystalline segments. The diamine or polyamine in effect cross-links the copolymer through the carboxyl groups in the form of diamine or polyamine salts in a more random and less crystalline form. This cross-linking is reversible so that the ionomer sheet when heated to the melting point becomes formable and processible and can be used in a laminate or substrate or even used alone without any additional substrate.

Some amount of irreversible cross-linking can be accomplished if desired by heating the ionomer resin film to 325°–400° F. for varying lengths of time under vacuum to cause the amine salts to convert to amides:

The conversion to the amides may range from 10%–100% conversion, depending on the length of time of the heating. This high temperature cross-linking of the finished article provides some cross-linking and heat set and thereby can increase the melting point of the ionomer sheet in the final article if desired in addition to adding toughness to the sheet material.

The primary aliphatic or alicyclic diamines or polyamines containing the —CH$_2$—NH$_2$ group can form the strongest bonds with the carboxyl group and therefore form the amino salt bond at the highest possible temperature of all the diamines or polyamines. If there is too great a distance between the —NH$_2$ groups and the chain is not rigid, too much flexibility occurs and the cross-linking effect becomes diminished and the diamine or polyamine may not be effective. Similarly, if the —CH$_2$—NH$_2$ groups are too close together there is steric interaction between the resultant amine salt groups causing weakening of amine salt formation and additionally, the amino groups cannot bridge the gap as readily between active carboxyl groups.

The CH$_2$—NH$_2$ group maximizes the basicity and minimizes steric inhibition to forming the amino salt bond. When secondary diamines or aromatic diamines are used, the basicity of steric inhibition to salt formation does not cause the diamine salt formation to occur soon enough on cooling of the ionomer sheet and haze formation occurs.

Primers may also be used to promote adhesion between the ionomer resin and the glass and polycarbonate respectively. Primers suitable for glass, and the glass/ionomer resin interface in particular, may include silanes, such as those produced under the registered trademarks "Z-6040" and "Z-6020" by Dow Chemical Company. Other primers suitable for the polycarbonate/ionomer resin interface in particular, include organic amines, usually in a diluted solution with an inert solvent (unlikely to attack the polycarbonate, e.g. alkanes and alcohols), such as aliphatic or polyethylene amines or ethanolamines, and specifically diethylenetriamine. Other specific primers include diisocyanates (toluene diisocyantate) and polyacrylic acid (produced under the registered trademark "ACRYSOL" by the Rohm and Haas Company).

The basic building block of this invention, namely a laminate comprising a sheet of glass laminated to an ionomer resin film, may be used in multiples to achieve nearly any desired strength. This is illustrated in FIG. 8, wherein lamina of varying thickness of glass are sandwiched with lamina of varying thickness of ionomer resin film. By varying the number and the thickness of the lamina of glass and ionomer resin film, always, however, laminating in the alternating order shown in the Figure, it is possible to produce laminates having resistance to exceptionally large force. The principles of this invention may also be applied to curved laminates articles, such as windshields and face masks. The laminates and films shown in the figures are flat merely for purposes of facilitating illustration. Where transparency is not critical, the bonding techniques taught herein may be used for laminating metal as well as glass such as illustrated in FIG. 7. Furthermore, by producing the ionomer resin neutralized by the diamines or polyamines discussed herein, it is possible to provide a clear film of substantial thickness and strength so that it can be used alone; i.e., without any additional laminated layer for support or enhanced impart resistance.

In providing the ionomer resin film of this invention, the preferred combination is ethylene methacrylic acid or ethylene-acrylic acid and a polyamine. The polyamines are preferably diamines of the general formula:

wherein:
x=contains 1-25 carbon atoms and may contain =NH, =N—CH$_3$, —CH$_2$—O—CH$_2$, other hetero atoms and halogens
R$^1$, R$^2$, R$^3$ and R$^4$=H, alkyl, alicyclic, and aromatic groups
y=1 or more The preferred general structural formula of the diamine is:

where R contains from 1-25 carbon atoms and R may be aliphatic, alicyclic or aromatic.

Still further, particularly useful diamines are those of the formula:

wherein:
R''' and R''=H, alkyl, aryl
q=1, 2 or 3 z=0–5
w=0–5
y=0–4
x+y=4
x=0–4

Specific polyamines which are particularly useful in combination with the ethylene methacrylic acid or ethylene-acrylic acid are: isophorone diamine; 1,12-dodecanediamine; 1,6-hexanediamine; 1,4-butane diamine; 1,3-bis (aminomethylcyclohexane); 1,3-diaminomethyl benzene; m-xylenediamine; diethylene triamine; N, N, bis (3-aminopropyl) peperidine; 1,4 butanediamine; 1,5 pentanediamine; and triethylenetetramine.

The ionomer resin film produced from the polyamines is intended to have a thickness of at least 50 mils when unsupported and at least 10 mil or more when used in laminates. Furthermore, this ionomer resin has superior optical clarity, i.e. light transmission greater than 60%, over previous ionomer resins of similar compositions for such thickness.

The preferred diamine is the 1,3 bis(aminomethyl)cyclohexane (BAC) having the general formula:

In addition, however, mixtures of diamines and other polyamines may be used.

Various acid polymers which are useful in the invention in addition to ethylene-methacrylic acid copolymer and ethylene-acrylic acid copolymer include polyacrylic acid copolymer and polymethacrylic acid copolymer.

The ionomer resin of the invention may also be prepared from the esterified form of the polymer material rather than beginning with the free acid. For example, the polymer starting materials may be: polymethylmethacrylate (PMMA), other polyacrylic esters, polyethylene and methamethacrylate copolymer, and ethylene methylacrylate (EMA) copolymer, styrene methylmethacrylate copolymer. Various other ester forms may be used as well, including the methyl, ethyl and propyl forms.

Furthermore, it is also possible to use only the partially esterified polymers, for example:

wherein:
R=H or $CH_3$
w=at least 1
x=at least 1
y=at least 1
z=at least 10

(It is preferable to have some small amount of water present during the reaction of the polyamine with the ester groups.)

It has been found that the ionomer resin films formed from the esterified or partially esterified forms of these polymers also have the required optical clarity in the ranges of thickness greater than 50 mils as well as in the film thickness ranges less than 50 mils.

In yet another combination of materials to produce the ionomer resin of the invention, it is possible to begin with a partially neutralized ionomer resin; an ionomer resin which has been previously at least partially neutralized with a metal. Thereafter, more complete the neutralization of the ionomer resin with the polyamide can be achieved according to the invention. Partially neutralized ionomer resin such as the ionomer resin SURLYN, previously discussed, which is either partially neutralized with zinc or sodium is a preferable starting resin. This partially neutralized resin may be combined with any of the polyamines of the general formula previously discussed.

EXAMPLE 1

In utilizing the preferred diamines discussed above in conjunction with the ionomers, satisfactory results have been obtained by mixing 1%–6% by weight of 1, 12 diaminododecane, 1,6 diaminohexane, and BAC(bis[1,3-aminomethyl]cyclohexane) to a commercial sodium ionomer (about 50% neutralized) of a copolymer of ethylene methacrylic acid (SURYLN 1701-DuPont). The resulting ionomer films whether containing both sodium and diamine salts or with diamine salts alone produced even tougher (more impact resistant), more solvent resistant, higher melting point films, more ultraviolet resistant and most importantly, higher clarity films and sheets.

EXAMPLE 2

A diamine was selected from the group of diamines listed below and was mixed with a partially neutralized Surlyn 1707 resin. The mixture was added to the resin port of a small extruder (Wayne Machine Co., 7-in extruder, with a nine inch die). The extruding barrel was maintained at 325°–400° F. A 50 to 60 mil film was extruded and cut into six inch squares stacked to about one-half inch thickness and laminated between two primed one-fourth inch glass plates in an autoclave at 255° F. for three minutes under 150–200 psi pressure in a vacuum. The final ionomer layer was optically clear and one-half inch or more in thickness with a light transmittance over 50%.

The following amines in the weight percents given were combined with Surlyn 1707. For each amine, excellent optical clarity was achieved.

| Amine | Weight Percent |
|---|---|
| (a) 1,4-butanediamine | 1 |
| (b) 1,6-hexanediamine | 1 |
| (c) BAC | 1 |
| (d) isophorone diamine | 3 |

EXAMPLE 3

Polyethyleneacrylic acid (Primacore 3440) was mixed with 8% by weight BAC and then heated to 280° F. in a flat plate mold under pressure to produce a flat, thick (½ inch) amine ionomer plate. The material was clear with some haze.

EXAMPLE 4

The same procedure disclosed in Example 3 was repeated using polyethylenemethacrylic acid, NUCREL by Dupont, plus water and 5% by weight 1, 12 diaminododecane. The resultant material was clear with some haze, but was exceptionally hard and tough.

EXAMPLE 5

In this example, 5% BAC was mixed with Nucrel (Dupont) resin. The mixture was heated to 300° F. The resin obtained was very hard, tough and optically clear.

EXAMPLE 6

The ½ inch plastic sheet of Example 3 was further heated at 350° F. for 15 minutes. The plastic became very hard. As discussed above, this heating is believed to be the result in the partial conversion of the amine salt ionomer to a cross-linked polyamide formation.

It is to be understood that the foregoing examples are given for the purpose of illustration and that any other suitable glass, ionomer resin, reinforcing plastics or the like could be used provided that the teachings of this disclosure are followed.

This invention may be embodied in other specific forms without departing from the spirit or essential attributes thereof, and accordingly, reference should be made to the appended claims, rather than to the foregoing specification, as indicating the scope of the invention.

What is claimed is:

1. In a copolymer containing alpha olefin units and alpha, beta ethylenically unsaturated carboxylic acid units, the improvement which comprises said copolymer being cross-linked with isophorone diamine.

2. An ionomer resin as claimed in claim 1, wherein said acid polymer is comprised of a partially neutralized hydrocarbon carboxylic acid copolymer.

3. An ionomer resin as claimed in claim 2, wherein said acid polymer is at least partially neutralized with a metal cation.

4. An ionomer resin as claimed in claim 3, wherein said acid polymer is at least partially neutralized with a cation selected from the group consisting of sodium, alkali metals, ammonium salt, aluminum salt, and zinc.

5. An ionomer resin as claimed in claim 2, wherein said acid polymer is selected from the group consisting of sodium and zinc ionomers of copolymers of ethylene-methacrylic acid and ethylene-acrylic acid.

6. The copolymer of claim 1 which is at least partially neutralized with a metal cation.

7. The copolymer of claim 6 wherein said metal cation is selected from the group consisting of alkali metals, aluminum, zinc and mixtures thereof.

8. The copolymer of claim 7 wherein said metal cation is sodium.

9. The copolymer of claim 7 wherein said cation is a mixture of zinc and sodium cations.

10. The copolymer of claim 1 which is a transparent film.

11. The copolymer of claim 1 which is thicker than 50 mils.

12. A sodium ionomer of ethylene methacrylic acid copolymer cross-linked with isophorone diamine.

* * * * *